May 10, 1949.    E. MEYER    2,469,398
ABRASIVE WHEEL AND METHOD OF MAKING THE SAME
Filed April 12, 1946

FIG. 1
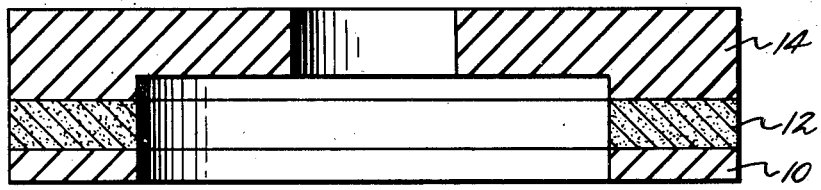

FIG. 2
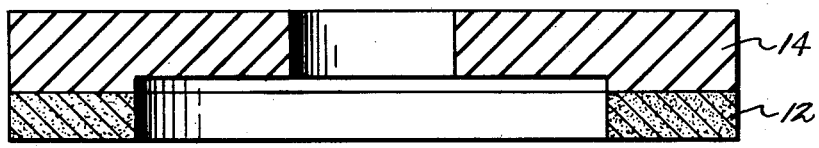

FIG. 3
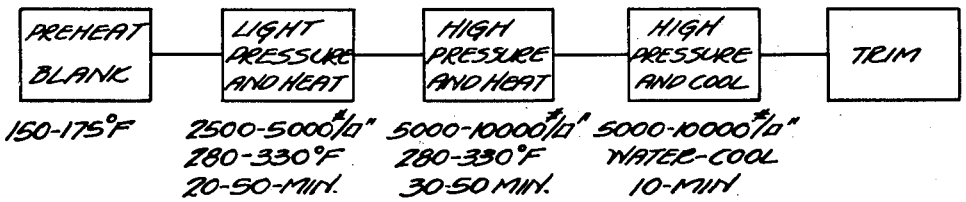

THERMO SETTING PROCESS

| PREHEAT BLANK | LIGHT PRESSURE AND HEAT | HIGH PRESSURE AND HEAT | HIGH PRESSURE AND COOL | TRIM |
|---|---|---|---|---|
| 150-175°F | 2500-5000 #/☐" 280-330°F 20-50 MIN. | 5000-10000 #/☐" 280-330°F 30-50 MIN. | 5000-10000 #/☐" WATER-COOL 10-MIN | |

FIG. 4
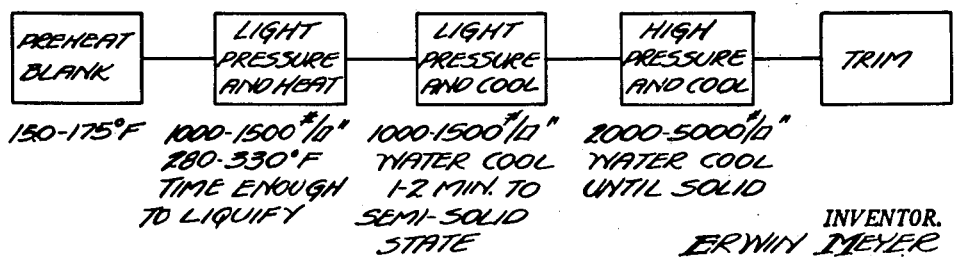

THERMO PLASTIC PROCESS

| PREHEAT BLANK | LIGHT PRESSURE AND HEAT | LIGHT PRESSURE AND COOL | HIGH PRESSURE AND COOL | TRIM |
|---|---|---|---|---|
| 150-175°F | 1000-1500 #/☐" 280-330°F TIME ENOUGH TO LIQUIFY | 1000-1500 #/☐" WATER COOL 1-2 MIN. TO SEMI-SOLID STATE | 2000-5000 #/☐" WATER COOL UNTIL SOLID | |

INVENTOR.
ERWIN MEYER
BY
Barnes, Kisselle, Laughlin & Raisch
ATTORNEYS.

Patented May 10, 1949

2,469,398

UNITED STATES PATENT OFFICE 2,469,398

ABRASIVE WHEEL AND METHOD OF MAKING THE SAME

Erwin Meyer, Detroit, Mich., assignor to Abrasive Dressing Tool Company, Detroit, Mich., a partnership composed of Jerry Krandall and Sadie Krandall Application April 12, 1946, Serial No. 661,729

11 Claims. (Cl. 51—298)

This invention relates to abrasive wheels and to an improved method of forming such wheels. With the advent of strong synthetic resin bonding materials, it has become possible to produce abrasive wheels containing diamond grit, tungsten carbide grit, and other very hard abrasive materials dispersed in a bond of synthetic resin having high strength and capable of withstanding the stresses inherent in high speed abrasive operations.

It is an object of the present invention to provide an improved wheel of this character and method of forming the same in one continuous time saving process rather than bonding or cementing together the various components of such wheels in separate operations, wherein an even distribution of the grit is obtained and wherein the density of the bond may be very precisely controlled during the forming operation.

More specifically the improved wheel and method involve the cushioning of a blank of abrasive material suspended in an unset bonding medium and the control of pressures and temperatures at different levels to insure that the grit is evenly distributed, that the grit distribution and orientation are not altered during the pressing operation and, at the same time, that a dense structure of the final article is produced. The invention is applicable to wheels bonded with both thermosetting resinous materials and with thermoplastic materials.

Figure 1 is a cross-sectional view of one type of wheel blank before pressing illustrating a preferred form of the present invention.

Figure 2 is a view corresponding to Figure 1 showing the finished wheel after the bottom cushion layer has been removed.

Figure 3 is a process diagram indicating a preferred process using thermosetting resin.

Figure 4 is a process diagram indicating a preferred process using thermoplastic resin.

The improved wheel may be formed by taking a mold conforming to the shape of wheel desired and placing therein a cushioning layer 10 of synthetic resin, bonding material 12 with grit dispersed therein and a final layer of bonding material 14 which acts as a cushion for the grit layer and also serves as a backing or support by which the wheel may be secured to the abrasive machine.

These layers are pressed into a composite blank and after preheating are placed into a hot mold and pressure is applied. In the case of thermosetting resins, the pressing operation is conducted at the start with relatively low pressure and with continued application of heat causing the resin bond to semi-cure or set in three layers 10, 12 and 14. At the same time, the provision of the resin layers 10 and 14 serves as a cushion for the grit layer 12 and prevents movement of the grit particles under the pressure forces which would normally occur if the grit layer faces were adjacent to the metal mold. This initial setting period is allowed to continue under the low pressure until the resin is semi-solid. At this point the grit particles are distributed uniformly throughout the grit layer and application of increased pressure will not disturb the grit distribution as would be true if the high pressure were applied when the resin is in the liquid state. After the initial set, the high pressure is applied which tends to exclude the formation of gaseous voids and restricts the flow of the bonding material while it is in the semi-solid state. After heat has been applied for the required curing interval, the mold is cooled either by air or preferably by circulating cooling fluid through passages in the mold provided for such purpose. This further prevents occlusion of gases and tends to eliminate warpage in the resinous material. After cooling, the pressure is released and the wheel removed from the mold at which time the cushioning layer 10 may be trimmed off by lapping or other suitable cutting tool.

In the event it is desired to use thermoplastic resins for bonding the wheel, a blank similar to Figure 1 is formed except for the different resins. The treatment of the blank however differs and consists in preheating the blank followed by the application of light pressure and further heat in the mold. After sufficient heat is applied to render the material liquid, the mold is cooled, preferably artificially, for an interval of time sufficient to permit the initial set to occur and thereafter the pressure is increased. The point of application of increased pressure is determined by the state of the thermoplastic material and when it has cooled to a semi-solid state, the application of increased pressure is begun. In other words, the increased pressure is not applied until the resinous material has begun to harden. Since the cooling step at low pressure renders the material semi-solid the crevices between the parts of the mold (not shown), the means by which the gases escape, are not restricted by the flow of the resin and the subsequent application of increased pressure permits the gases to escape through these unrestricted crevices. By this means the occlusion of gases is reduced and the density of the wheel is materially increased.

It will be seen from either method described above that by employing an initial setting period or "set cure" a completely formed wheel consisting of a backing member, an abrasive grit layer, and a protective layer may be formed in one process. Also, the resultant wheel is gas free which strengthens it and prolongs its life and the density of the resin bonding layers may be greatly increased over previous methods by careful control of the application of heat and pressure.

While the invention has been disclosed in but two embodiments, it will be evident that other forms may be adapted. Thus layers 10, 12 and 14 may be of dissimilar resins. For example cushioning layers of thermoplastic resins may be used to bond a grit layer previously cured from thermosetting resin. In this case, the use of the cushioning layer 10 is particularly advantageous in avoiding damage to the grit structure in layer 12.

Following are specific compositions of grit and cushion layers illustrative of my invention, although my invention should not be considered limited to these particular compositions. The proportions given are by weight.

1.—*Thermosetting synthetic resin grit layer*

A

| | Parts |
|---|---|
| Diamonds | 40 |
| Bond modifiers of mineral nature, like quartz, mica, pumice, aluminum oxide, kalvin, kieselguhr, talc, soapstone, diatomaceous earth, magnesia, lime; also organic fibers or asbestos fibers | 40 |
| Thermosetting resins: phenolic or ureas | 18 |
| Lubricants like zinc, calcium or barium stearates | 2 |

B

| | Parts |
|---|---|
| Diamonds | 20 |
| Bond modifiers | 50 |
| Thermosetting resins | 26 |
| Lubricant | 4 |

2.—*Thermoplastic synthetic resin grit layer*

A

| | Parts |
|---|---|
| Diamonds | 40 |
| Thermoplastic resins such as polystyrene, acrylic resin, cellulose derivatives, vinyl resins, alkyd resins | 51 |
| Modifiers | 6 |
| Plasticiser | 3 |

3.—*Cushion layer for thermosetting bond*

A

| | Parts |
|---|---|
| Thermosetting resins | 30 |
| Bond modifiers | 68 |
| Mold lubricant | 2 |

4.—*Cushion layer for thermoplastic bond*

A

| | Parts |
|---|---|
| Thermoplastic resin identical with thermoplastic bond in diamond layer | 100 |

I claim:

1. An abrasive wheel comprising a dense, gas-free layer of abrasive-impregnated synthetic resin integrally bonded between a layer of synthetic resin which serves as a backing member and a protective layer of synthetic resin, said protective layer being removable prior to the use of the wheel.

2. The method of forming a diamond cutting wheel in a continuous process which comprises the steps of assembling a blank comprising a layer of synthetic resin powder, a layer of diamond impregnated synthetic resin powder and a layer of synthetic resin powder in that order, subjecting the blank to temperature and low pressure until the resin is semi-cured, then increasing the pressure to completely cure the resin and render the blank more dense and thereafter removing the first mentioned layer from the wheel.

3. The method of forming a diamond cutting wheel which comprises the steps of assembling a blank comprising a layer of thermosetting synthetic resin powder, a layer of diamond impregnated synthetic resin powder and a layer of thermosetting synthetic resin powder in that order, subjecting the blank to heat and low pressure to liquify the resin and to convert the liquid resin to a semi-solid state, increasing the pressure to completely solidify the resin and render the blank more dense, cooling the resin and thereafter removing the first mentioned layer.

4. The method of forming a diamond cutting wheel which comprises the steps of assembling a blank comprising a layer of thermosetting synthetic resin, a layer of diamond impregnated synthetic resin and a layer of thermosetting synthetic resin in that order, the synthetic resin in powder form, heating the blank to a temperature of 280–330° F. under a pressure of 2,500–5,000 lbs. per sq. in. for 20 to 50 minutes, increasing the pressure to 5,000–10,000 lbs. per sq. in., maintaining the above mentioned temperature and the last mentioned pressure for 30 to 50 minutes, water cooling at the last mentioned pressure for 10 minutes and thereafter removing the first mentioned layer from the wheel.

5. The method of forming a diamond cutting wheel which comprises the steps of assembling a blank comprising a layer of thermoplastic synthetic resin, a layer of diamond-impregnated synthetic resin and a layer of thermoplastic synthetic resin in that order, subjecting the blank to heat and low pressure to liquify the resin, cooling at low pressure to convert the liquid resin to a semi-solid state, continued cooling under high pressure to completely solidify the resin and thereafter removing the first mentioned layer from the wheel.

6. The method of forming a diamond cutting wheel which comprises the steps of assembling a blank comprising a layer of thermoplastic synthetic resin, a layer of diamond impregnated synthetic resin and a layer of thermoplastic synthetic resin in that order, subjecting the blank to a temperature of 280–330° F. under a pressure of 1,000–2,000 lbs. per sq. in. water cooling for 1 to 2 minutes, continued water cooling under a pressure of 2,000–5,000 lbs. until completely solid, and thereafter removing first mentioned layer from the wheel.

7. The method of forming an abrasive cutting wheel which comprises heating under low pressure a layer of abrasive-impregnated thermosetting synthetic resin in powder form to liquefy the resin and convert the liquid resin to a semi-solid state and thereafter completely solidify the resin, increasing the pressure to remove occluded gases and render the layer more dense.

8. The method of forming an abrasive cutting wheel which comprises heating a layer of abrasive-impregnated thermoplastic synthetic resin, cooling under low pressure to convert the liquid resin to a semi-solid state and thereafter increasing the pressure to completely solidify the resin, remove occluded gases and render the layer more dense.

9. The method of forming an abrasive cutting wheel which comprises pressing together in a heated mold a layer of abrasive-impregnated synthetic resin and maintaining layers of non-impregnated synthetic resin between the impregnated layer and the mold.

10. The method defined in claim 9 wherein at least one of the non-impregnated layers is thermoplastic.

11. The method of forming an abrasive cutting wheel in a single continuous process which comprises the steps of assembling a blank comprising three distinct layers of synthetic resin powder, the middle layer having abrasive uniformly dispersed therein and the other two layers being of sufficient thickness to cushion said abrasive layer when pressure is applied to said blank, subjecting the blank to heat and light pressure until the resin has been liquified and converted to a semi-solid, increasing the pressure to completely solidify the resin and render the blank more dense, and thereafter removing one of said outer layers to expose the abrasive impregnated layer integrally bonded to a layer of synthetic resin which serves as a rigid backing support for the abrasive impregnated layer.

ERWIN MEYER.

REFERENCES CITED

The following references are of record in the file of this patent:

UNITED STATES PATENTS

| Number | Name | Date |
| --- | --- | --- |
| 942,808 | Baekeland | Dec. 7, 1909 |
| 1,785,437 | Doermann | Dec. 16, 1930 |
| 1,832,515 | Webster | Nov. 17, 1931 |
| 1,981,970 | Sanford | Nov. 27, 1934 |
| 2,143,636 | Tone | Jan. 10, 1939 |